US007971847B1

(12) United States Patent
Hartzell et al.

(10) Patent No.: US 7,971,847 B1
(45) Date of Patent: Jul. 5, 2011

(54) ROOF RACK AND ROOF RACK SYSTEM FOR A PORTABLE SHELTER

(75) Inventors: Craig W. Hartzell, Morgantown, WV (US); Kevin G. Koch, Fairmont, WV (US); Aaron M King, Kingwood, WV (US); Douglas L. Shaffer, Fairmont, WV (US)

(73) Assignee: Azimuth, Inc., Morgantown, WV (US)

( * ) Notice: Subject to any disclaimer, the term of this patent is extended or adjusted under 35 U.S.C. 154(b) by 857 days.

(21) Appl. No.: 11/375,918

(22) Filed: Mar. 15, 2006

(51) Int. Cl.
*A47G 29/00* (2006.01)
*F16M 11/00* (2006.01)

(52) U.S. Cl. ........................................ 248/688; 248/237

(58) Field of Classification Search ............... 211/105.1, 211/123, 206, 204, 182; 248/689, 237, 218.4, 248/228.1, 227.2, 227.4, 688; 224/309, 329, 224/322, 323, 330, 331, 405; 296/3
See application file for complete search history.

(56) References Cited

U.S. PATENT DOCUMENTS

| | | | | | |
|---|---|---|---|---|---|
| 30,325 | A | * | 10/1860 | Jones | 248/237 |
| 2,156,748 | A | * | 5/1939 | Walker | 211/123 |
| 2,517,467 | A | * | 8/1950 | Culver | 211/86.01 |
| 3,043,438 | A | * | 7/1962 | Chmielewski | 211/105.6 |
| 4,101,061 | A | * | 7/1978 | Sage et al. | 224/322 |
| D265,815 | S | * | 8/1982 | Francis | D12/412 |
| 4,449,656 | A | * | 5/1984 | Wouden | 224/320 |
| 4,603,828 | A | * | 8/1986 | Farley et al. | 248/542 |
| 4,649,675 | A | * | 3/1987 | Moldovan et al. | 52/27 |
| 4,757,929 | A | * | 7/1988 | Nelson | 224/329 |
| 4,773,575 | A | * | 9/1988 | Morrison, III | 224/405 |
| D398,284 | S | * | 9/1998 | Carter et al. | D12/406 |
| 5,803,273 | A | * | 9/1998 | Menaged et al. | 211/87.01 |
| 5,862,964 | A | * | 1/1999 | Moliner | 224/329 |
| 6,347,731 | B1 | * | 2/2002 | Burger | 224/405 |
| 6,622,898 | B1 | * | 9/2003 | Wang | 224/321 |
| 7,089,705 | B1 | * | 8/2006 | Lieberman | 52/146 |
| 7,152,902 | B2 | * | 12/2006 | Moen et al. | 296/100.18 |
| 7,232,099 | B1 | * | 6/2007 | Wilcox | 248/228.1 |
| 7,419,075 | B2 | * | 9/2008 | Green | 224/405 |
| 2003/0000168 | A1 | * | 1/2003 | Sagiao | 52/654.1 |

FOREIGN PATENT DOCUMENTS

| | | | | |
|---|---|---|---|---|
| DE | 3301706 | A1 | * | 8/1984 |
| DE | 3619673 | A1 | * | 7/1987 |
| DE | 3625785 | A1 | * | 2/1988 |
| DE | 3817470 | A1 | * | 11/1989 |
| EP | 193501 | A2 | * | 9/1986 |
| EP | 338633 | A1 | * | 10/1989 |
| GB | 2201924 | A | * | 9/1988 |

* cited by examiner

*Primary Examiner* — Darnell M Jayne
*Assistant Examiner* — Stanton L Krycinski
(74) *Attorney, Agent, or Firm* — Dinsmore & Shohl, LLP; Monika J. Hussell

(57) ABSTRACT

According to the present invention, a rook rack and a system of multiple roof racks of the present invention may be used to securely support equipment, such as, but not limited to, a satellite, to the roof of a portable shelter. The roof rack of the present invention generally comprises a crossbar and a pair of side supports coupled to each end thereof. A roof rack system of the present invention comprises at least two of these roof racks. The present invention further relates to a method of securing equipment to the roof of a portable shelter. This method comprises first providing a roof rack, and assembling and securing the same to the roof. After the roof rack system is secured to the roof of the portable shelter, the equipment, or an equipment platform, is placed on the crossbars and secured in its position by securing means, such as one or more clamps.

5 Claims, 6 Drawing Sheets

ROOF RACK AND ROOF RACK SYSTEM FOR A PORTABLE SHELTER

BACKGROUND OF THE INVENTION

The present invention relates to a roof rack and a roof rack system for a portable shelter, and to a method of securing a satellite and other equipment to the roof of said shelter.

BRIEF SUMMARY OF THE INVENTION

According to the present invention, a rook rack and a system of multiple roof racks of the present invention may be used to securely support equipment, such as, but not limited to, a satellite, to the roof of a portable shelter. Generally, the roof rack of the present invention comprises a crossbar and a pair of side supports coupled to each end thereof. In accordance with one embodiment of the present invention, a roof rack is designed and configured to removably affix to the roof of an ISO (International Standards Organization) shelter.

Generally, the crossbar of the roof rack of the present invention is configured as a tube, and at least one of the side supports comprises a channel, a support structure, and a retaining structure, wherein: the channel of the side support is sized and configured to receive an end of the crossbar; the support structure is designed and configured to provide stability to the rack when resting on a portion of the roof; and the retaining structure is designed and configured to localize the position and restrain movement of the side support in relationship with the portable shelter. When assembled and positioned on the roof of a portable shelter, each of the side supports is coupled to opposite ends of the crossbar and securely engaged with opposite edges of the roof of the shelter.

To secure equipment, such as a satellite, to the roof rack or roof rack system of the present invention, and, thus, to the roof of a portable shelter, the rack or the system may further comprise at least one clamp, configured to form an enclosed opening to secure equipment to the crossbar of a roof rack by binding either the equipment itself or an equipment platform to the crossbar. This equipment or equipment platform is bound to the crossbar by passing the clamp over a portion of the equipment, or an arm of the equipment platform, and a portion of the crossbar, and forming the enclosed opening such that the clamp secures about both the equipment, or the arm of the equipment platform, and the crossbar.

Another embodiment of the present invention relates to a method of securing equipment to a roof of a portable shelter. This method comprises first providing at least one roof rack described above, and assembling and securing the same to the roof of the shelter. After the roof rack is secured to the roof of the shelter, the equipment, or an equipment platform, is placed on the crossbars and secured in its position by at least one clamp.

Accordingly, it is an object of the present invention to provide a roof rack and a roof rack system that are compatible for use with an ISO or other portable shelter, and a method of securing equipment to a roof of said shelter. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
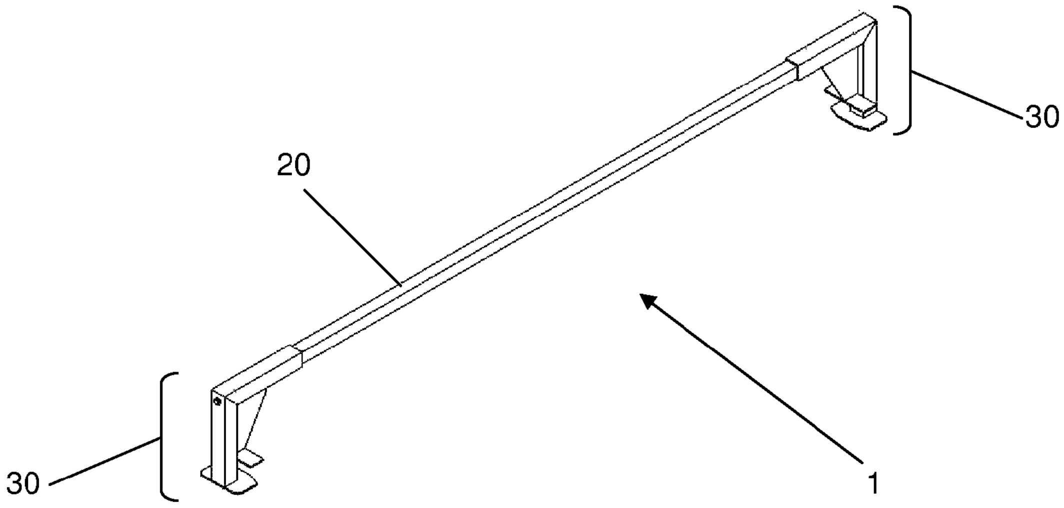
FIG. 1 is a peripheral view of an embodiment of a roof rack of the present invention.

Referring generally to the figures, the present invention relates to a roof rack 1 and a roof rack system 10 for a portable shelter 60, and to a method of securing a satellite 70, or other equipment, to the roof 62 of said shelter 60.

Some embodiments of the present invention are designed and configured to secure to an ISO shelter 60, which comprises a roof 62, a roof lip 62A, and siding 64. The roof lip 62A is a structure that is affixed to the outer perimeter of the roof 62 and is configured to bind the perimeter of the roof 62 to the siding 64 of the ISO shelter 60. As such, when binding the roof 62 to the siding 64, the roof lip 62A forms an edge protruding from where the roof 62 is bound to the siding 64. In addition, the siding 64 of the ISO shelter 60 is preferably configured as angular corrugated siding that comprises parallel alternating grooves and ridges. Certain embodiments of the present invention are designed and configured to engage with said corrugated siding 64, thereby securely affixing and restraining movement of a roof rack 1.

Figure 9:
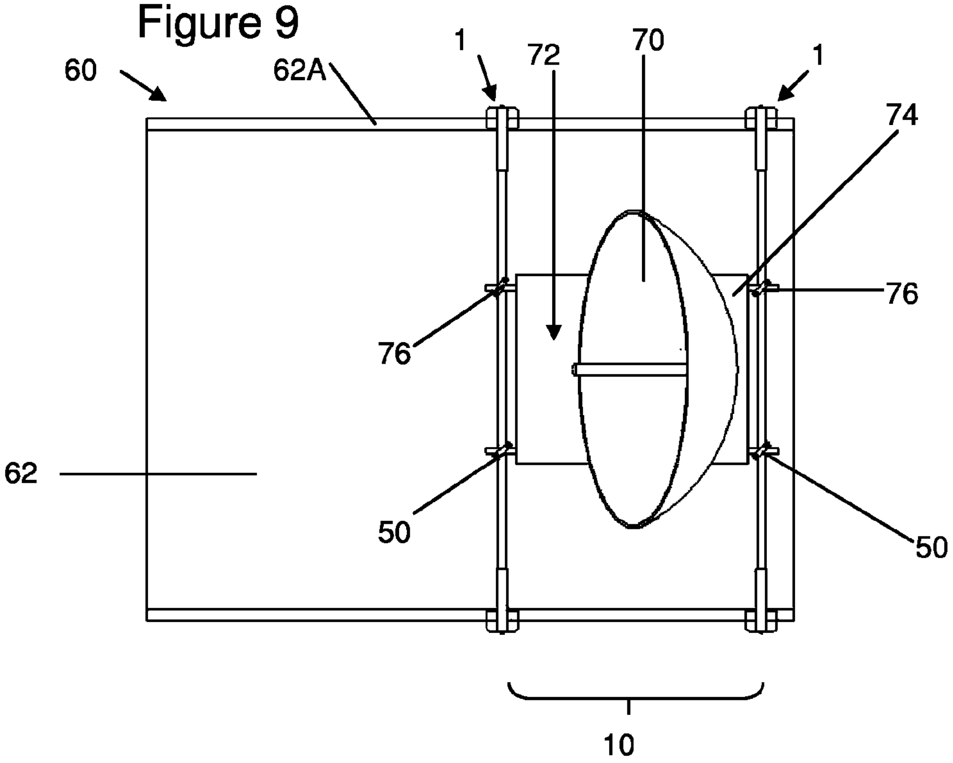
FIG. 9 is a top view of an embodiment of a roof rack system of the present invention securing a satellite to the roof of a portable shelter by means of clamps.
Figure 11:
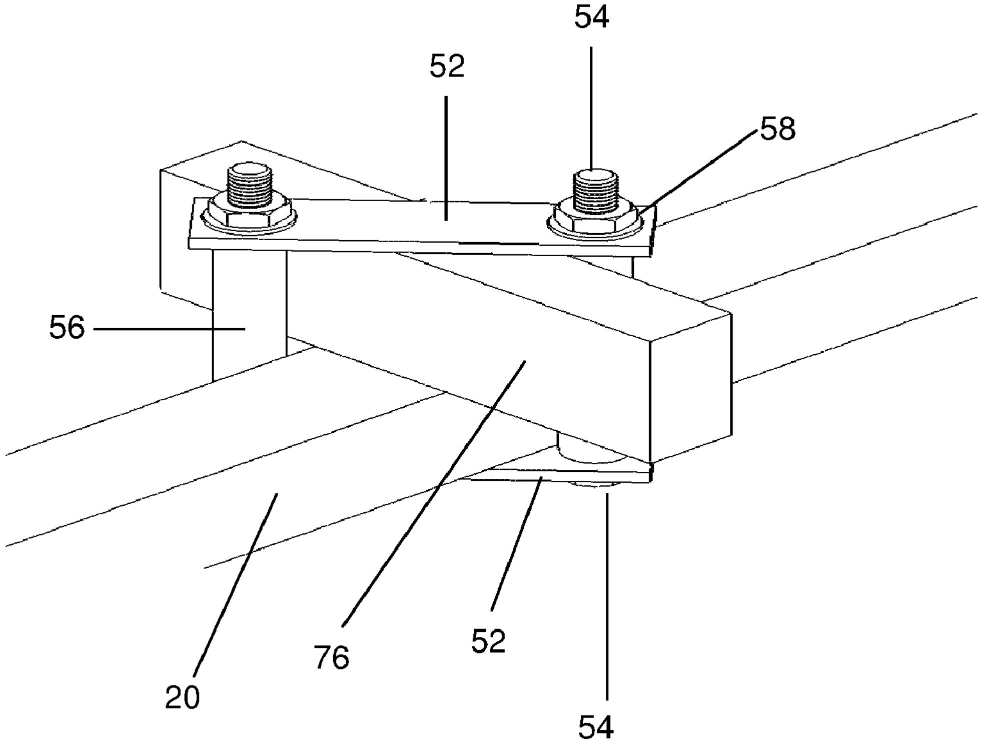
FIG. 11 is a view of the clamp securing an equipment platform to a crossbar of the roof rack of the present invention.

A roof rack 1, or a system 10 of multiple roof racks, may be used to securely support equipment such as, but not limited to, a satellite 70, to the roof 62 of a portable shelter 60. The roof rack 1 of the present invention, an embodiment of which is shown in FIG. 1, generally comprises a crossbar 20 and a pair of side supports 30 coupled to each end thereof. The roof rack system 10 of the present invention, an embodiment of which is shown in FIGS. 9 and 11, comprises at least two roof racks 1.

Figure 2:
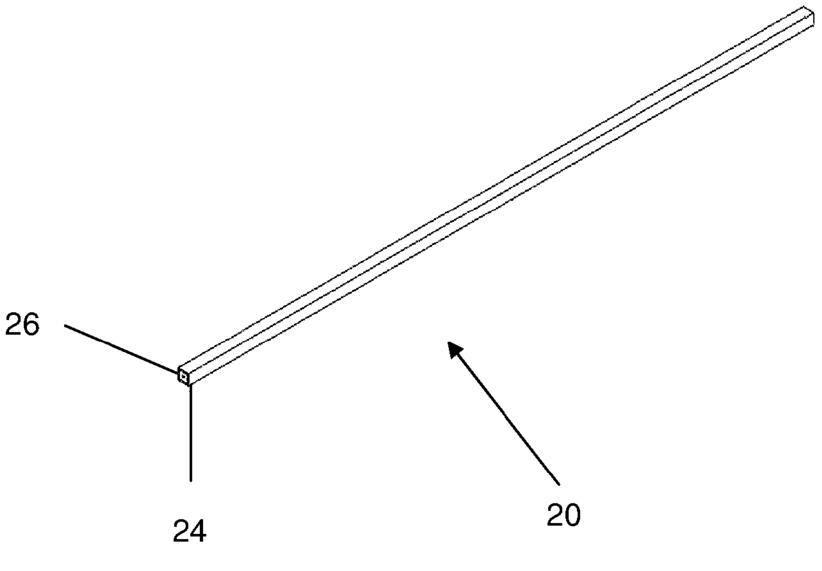
FIG. 2 is a peripheral view of the crossbar of an embodiment of the roof rack of the present invention.

As depicted in FIG. 2, the crossbar 20 of the present invention generally is configured as a hollow or solid tube. In addition, the cross-section of the crossbar may be configured in a curved, circular, angular, or multi-angular, or any combination thereof, fashion. The crossbar 20 is designed and manufactured from materials sufficient to support the equipment to be secured thereto. Preferably, the crossbar 20 is a hollow, straight tube, having a relatively square cross-section, manufactured from galvanized steel, with a thickness of ⅛" and having dimensions 1¾"×1¾"×96"

Figure 3:
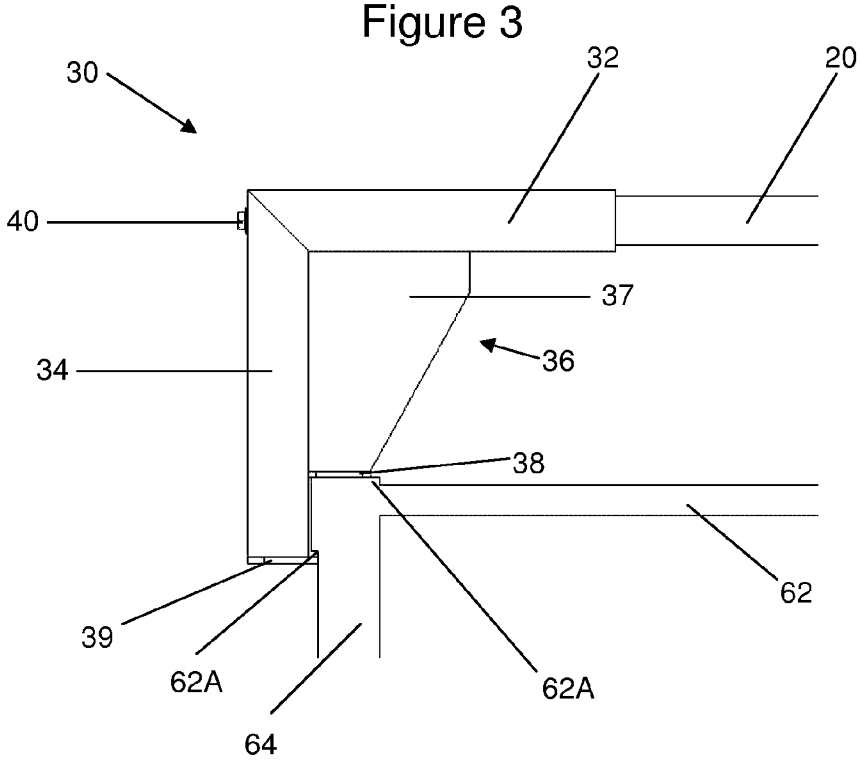
FIGS. 3 and 4 are views of an embodiment of a side support of the roof rack of the present invention.
Figure 4:
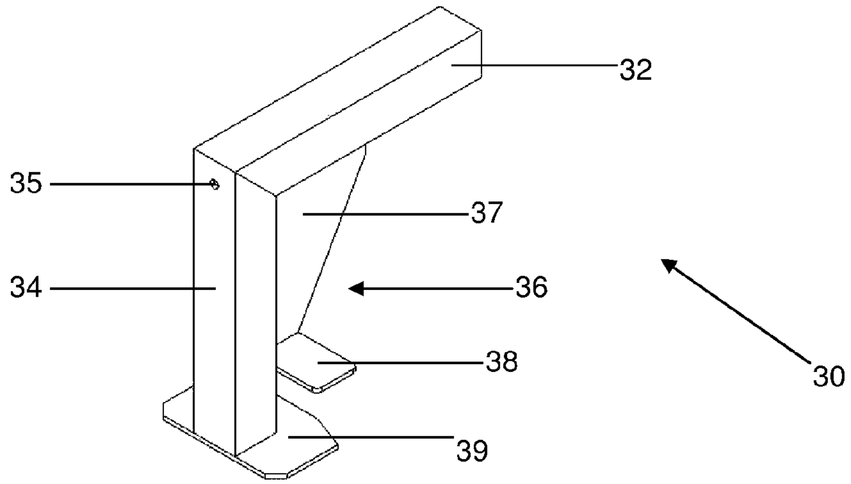

The side support 30 of the present invention, an embodiment of which is shown in FIGS. 3 and 4, typically comprises a channel 32, a support structure 36, and a retaining structure 34. The channel 32 generally is sized and configured to receive an end portion of the crossbar 20. The cross-section of this channel 32 may be configured in a curved, circular, angular, or multi-angular, or any combination thereof, fashion that corresponds with the cross-sectional configuration of the crossbar 20. Preferably, the crossbar 20 and the channel 32 are provided with corresponding square cross-sections, the cross-section of the exterior of the crossbar 20 being at least slightly smaller than the cross-section of the interior of the channel 32; however, one of the side supports 30 may extend from the crossbar 20, in which case the crossbar 20 and the channel 32 may be manufactured as and constitute a single tube. In a preferred embodiment, the channel 32 is manufactured from galvanized steel, with a thickness of 1/8" and having dimensions 2"×2"×12".

Figure 5:
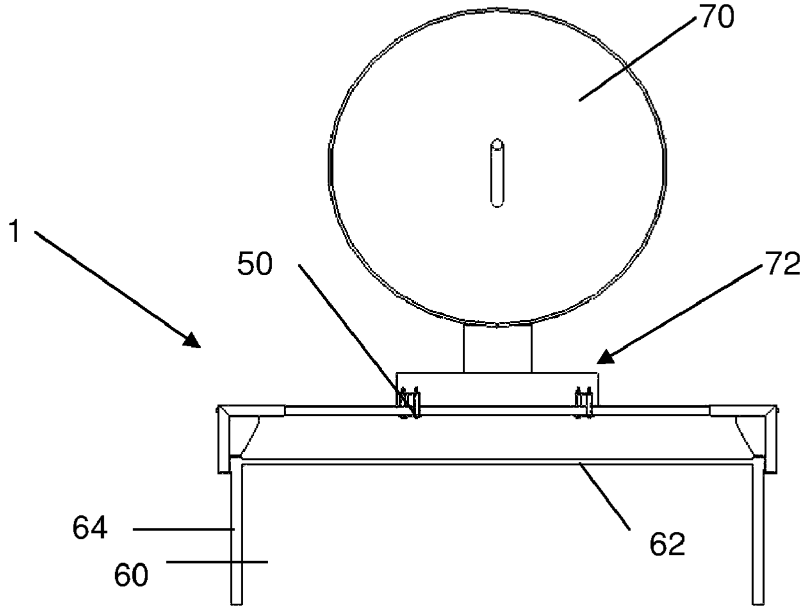
FIG. 5 is a side view of an embodiment of a roof rack system of the present invention securing a satellite to the roof of an ISO shelter.
Figure 6:
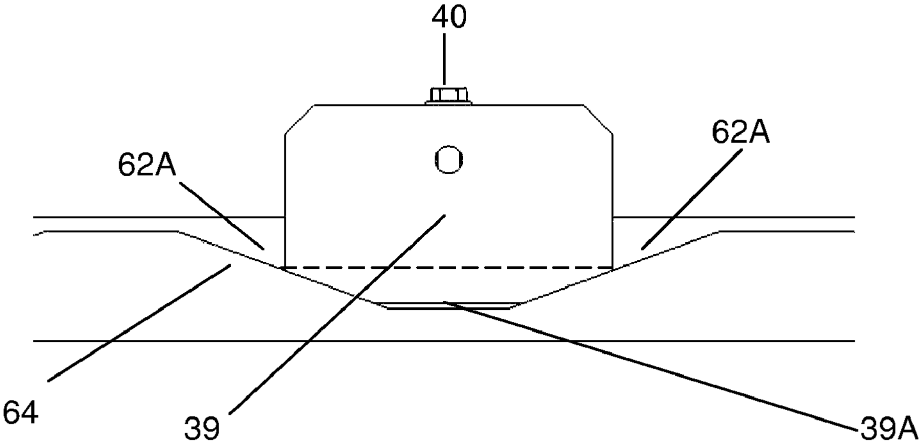
FIGS. 6 and 7 are bottom and peripheral views, respectively, of the lower plate foot of an embodiment of the side support of the present invention.
Figure 7:
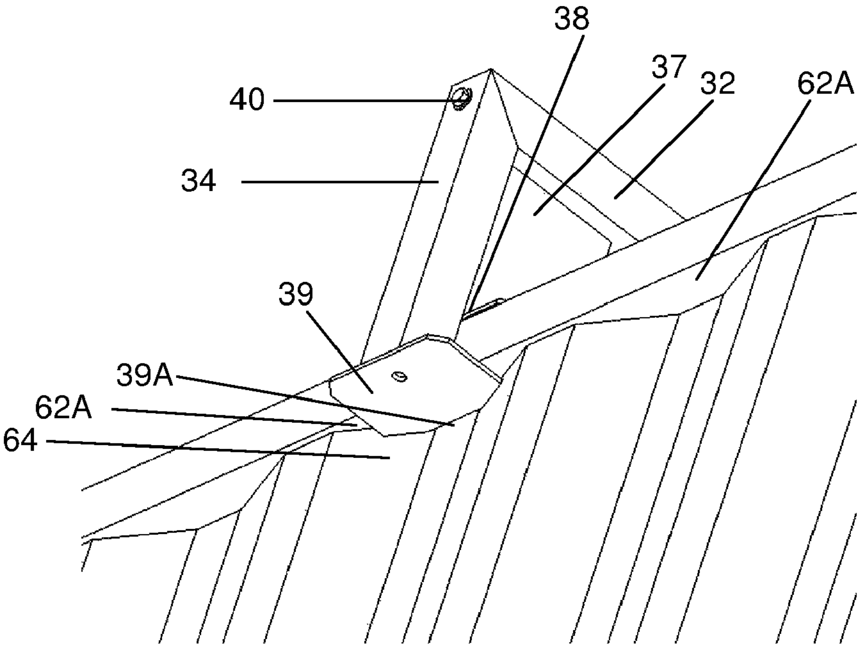

As shown in FIGS. 3 and 5, the support structure 36 is configured to rest on the roof 62 of a portable shelter 60. Preferably, the support structure 36 comprises a triangular, rectangular or, more preferably, a pentagonal plate 37, which is affixed to or formed as part of, and extends from, a portion of the channel 32 at a first lateral edge of the plate. Extending perpendicularly from a second lateral edge of the plate is a plate foot 38 that is affixed to or formed as a part of the plate 37. This plate foot 38 may be designed to rest on the roof lip 62A to provide additional stability for the roof rack 1 by increasing the planar surface upon which the support structure 36 rests. The support structure 36 and its components are designed and manufactured from materials sufficient to support the crossbar 20 and any equipment intended to be supported by the roof rack 1. In a preferred embodiment, the support structure 36 and its components are manufactured from galvanized steel, having a thickness of 3/16".

As shown in FIGS. 3-7, the retaining structure 34 comprises a hollow or solid tube having a vertical surface along the exterior thereof, and first and second ends. The tube extends at its first end from the end of the channel 32, and has a lower plate foot 39 extending perpendicularly from the second end of the tube. This lower plate foot 39 is preferably configured to correspond with the angular corrugated siding 64 of an ISO shelter 60 and extend within the lower edge of the roof lip 62A. Specifically, the lower plate foot has a leading edge 39A, with a portion of the extension including the leading edge being shaped as an isosceles trapezoid (as shown with broken lines in FIG. 6). This angular configuration of the lower plate foot 39 serves to localize the position of the side support 30 to the angular corrugated siding 64 of the ISO shelter 60 and, thus, restrains movement of the roof rack 1. Preferably, the tube of the retaining structure 34 is manufactured from 1/8" galvanized steel and has a square cross-section which is substantially similar to the cross-section of the channel 32, whereby each concludes at a corresponding angle to abut against the other. Preferably, the lower plate foot is manufactured from 3/16" galvanized steel. The retaining structure 34 may then be welded, affixed to, or formed as part of the channel 32 at said angle. Each upper plate foot 38 is in offset parallel configuration to a lower plate foot, as shown in the Figures.

Figure 8:
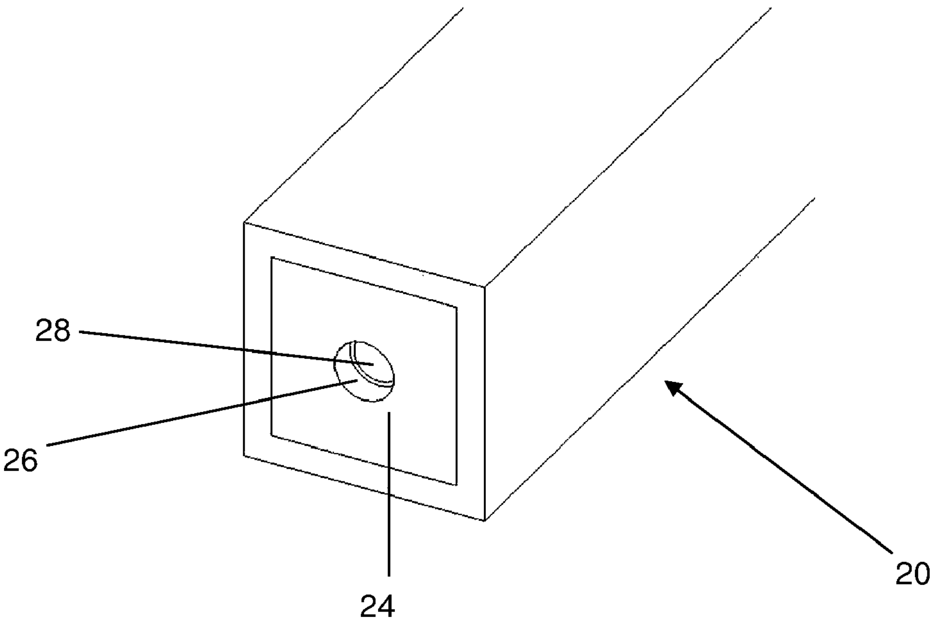
FIG. 8 is a partial view of the crossbar of an embodiment of the roof rack of the present invention.

In order to allow affixation of at least one side support 30 to the crossbar 20, the crossbar 20 may further comprise at least one capped end 24, as shown in FIGS. 2 and 8. This capped end 24 may have an aperture 26 and a weld nut 28, or other similar device, affixed inside the crossbar 20 behind the aperture 26, to secure the threads of a bolt 40, or other similarly configured device, to the capped end 24. The tube 34 of the side support 30 may be configured with at least one aperture 35 that corresponds with said aperture 26 in the capped end 24 of the crossbar 20, when the same is positioned within said channel 32. A bolt 40, or other similarly configured device, is passed through the aperture 35 in the tube 34 and the aperture 26 and the weld nut 28 in the capped end 24, to secure the capped end 24 and a length of the crossbar 20 within the channel 32. The bolt 40 is adjustably secured in the weld nut 28 such that the length of the crossbar 20 present within the tube receiving channel 32 increases as the bolt 40 is secured.

It is contemplated that the roof rack 1 of the present invention will be partially pre-assembled, with the side supports 30 and crossbar 20 each being formed by welding, molding, or other similar techniques and, in an embodiment, with one of said side supports 30 being affixed to, or formed as an extension of, the crossbar 20. To assemble the roof rack 1 of the present invention, using an embodiment thereof as an example, the crossbar 20 and side supports 30 are positioned on the roof 62, and the bolts 40 or other affixation means are inserted into apertures 26 and 35, and secured so that: the crossbar 20 is partially received within at least one channel 32; the plate foot 38 of the support structure 36 rests on the roof lip 62A of the shelter 60; and the lower plate foot 39 of the retaining structure 34 extends under the lower edge of the roof lip 62A, and the leading edge 39A of the lower plate foot 39 rests along a portion of the corresponding portions of the corrugated siding 64 of the shelter 60. To achieve this positioning, angles of the lower plate foot 39 (formed as part of the isosceles trapezoid) are aligned with the corrugated siding 64 of the shelter 60, and the length of the crossbar 20 is adjusted within the channel 32 so that the length of the roof rack 1 corresponds to the width of the roof 62 of the shelter 60.

Figure 10:
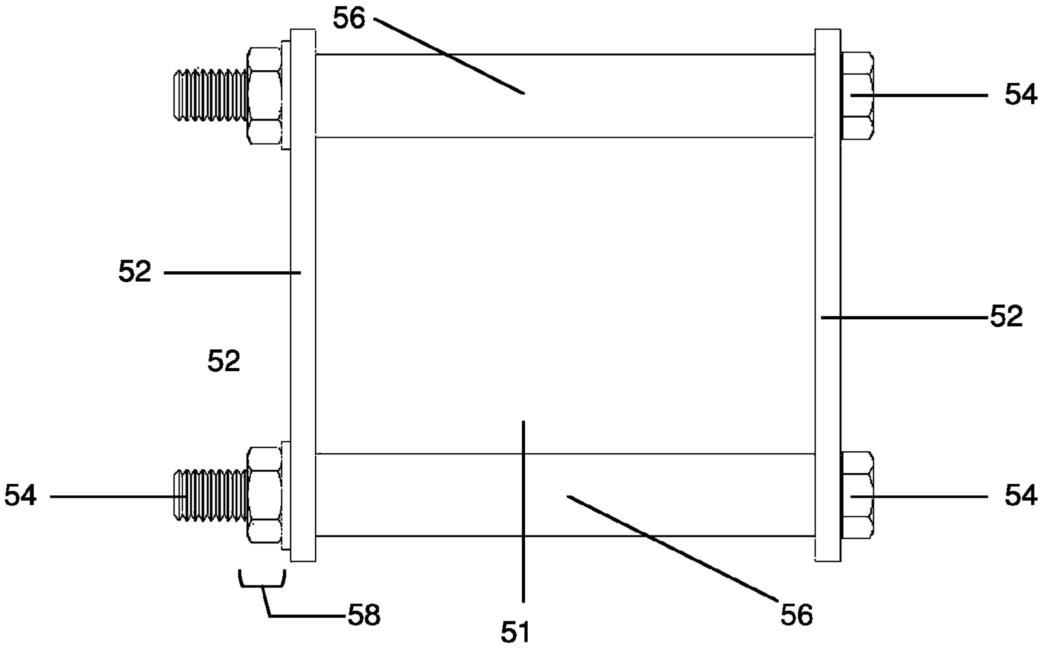
FIG. 10 is a view of the clamp of an embodiment of the roof rack of the present invention.

As shown in FIGS. 5 and 9, to secure equipment, such as a satellite 70, to the roof rack 1 or the roof rack system 10 and, thus, to the roof 62 of a shelter 60, the roof rack 1 or roof rack system 10 may further comprise at least one clamp 50. The clamp 50, in the depicted embodiments of FIGS. 9, 10, and 11, is configured to form an enclosed opening 51 and generally comprises two rigid plates 52 and two bolts 54, the rigid plates 52 having corresponding apertures to receive the bolts 54. The clamp 50 may further comprise bolt sleeves 56 to cause the plates 52 to have at least a minimum separation, and bolt securing means, such as washer/nut assemblies 58. As shown in FIGS. 9 and 11, this clamp 50 may be configured to secure equipment to the crossbar 20 of the roof rack 1 or roof rack system 10 by binding either the equipment itself or an equipment platform 72 to the crossbar 20. This equipment platform 72 is configured to serve as a stable support for equipment and comprises a level base 74, at least one arm 76 extending from this base 74, and one or more apertures, or other securing devices for securing the equipment to the equipment platform 72. Some satellite systems include a satellite base, which functions well as the equipment platform when the leveling feet thereof are removed. Preferably, the base 74 is provided in a rectangular configuration. As shown in FIG. 11, the equipment or equipment platform 72 are bound to the crossbar 20 by passing the clamp over a portion of the equipment, or an arm 76 of the equipment platform, and the crossbar 20, and forming the enclosed opening 51 such that the clamp 50 secures about both the equipment, or the arm 76, and the crossbar 20.

Another embodiment of the present invention relates to a method of securing equipment to a roof 62 of a portable shelter 60. This method comprises first providing a roof rack system 10 that comprises at least one roof rack 1 as described above and assembling and securing the same to the roof 62. The use of multiple roof racks 1 provides stabilizing support for the equipment. After the roof rack system 10 is secured to the shelter 60, the equipment, or the equipment platform 72, is then placed on the crossbars 20 and secured in its position by securing means, such as one or more clamps 50.

It is noted that terms like "preferably" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims.

What is claimed is:

1. A roof rack suitable for use on a portable shelter having corrugated siding, the roof rack comprising a crossbar having two end portions and a center, a tube having first and second ends and a vertical surface, a channel, wherein said channel is positioned between the first end of the tube and the end portion of the crossbar, and wherein said tube is engaged with said channel at the first end of said tube, a support plate having a plate face and first and second lateral edges, wherein the support plate extends from the vertical surface of said tube and is affixed at its first lateral edge to the channel, and a first plate foot extending perpendicular from the second end of said tube to a leading edge, with a portion of such extension including the leading edge being shaped as an isosceles trapezoid and extending from the tube towards the center of said crossbar, and a second plate foot rigidly extending perpendicular from the second lateral edge of said support plate, wherein said second plate foot is in offset parallel configuration with said first plate foot.

2. The roof rack of claim 1, wherein said crossbar is manufactured from ⅛" thick galvanized steel.

3. The roof rack of claim 1, wherein said channel and said tube are manufactured from galvanized steel.

4. The roof rack of claim 1, wherein said crossbar further comprises at least one capped end, having an aperture; and wherein said tube has an aperture, the apertures being in parallel alignment to receive a bolt.

5. A roof rack suitable for use on a portable shelter having corrugated siding, the roof rack comprising:

a crossbar having two opposing end portions, first and second tubes, each having first and second ends and a vertical surface, with each tube engaged with and positioned at its first end perpendicularly to said cross bar, at opposite end portions thereof, first and second channels, wherein each channel is positioned between the first end of the first or second tube, respectively, and the corresponding end portion of the crossbar, first and second support plates, each having a plate face and first and second lateral edges, with each support plate extending from the vertical surface of the first or second tubes, respectively, and each further being affixed at its first lateral edge to the first or second channel, respectively, first and second upper plate feet, extending perpendicularly from the plate face of the first or second support plates, respectively, at the second lateral edge thereof, and first and second lower plate feet, extending perpendicularly from the second end of the first or second tubes, respectively, wherein each upper plate foot is in offset parallel configuration to a lower plate foot.

* * * * *